United States Patent [19]

Buhrer

[11] Patent Number: 5,115,481
[45] Date of Patent: May 19, 1992

[54] MULTI-POSITION OPTICAL FIBER ROTARY SWITCH

[75] Inventor: Carl F. Buhrer, Framingham, Mass.

[73] Assignee: GTE Laboratories Incorporated, Waltham, Mass.

[21] Appl. No.: 736,263

[22] Filed: Jul. 23, 1991

[51] Int. Cl.⁵ .............................................. G02B 6/34
[52] U.S. Cl. ..................................... 385/25; 359/204; 359/211; 359/640; 359/834; 385/26; 385/36
[58] Field of Search ............... 350/96.10, 96.15, 96.18, 350/96.19, 96.20, 169, 170, 286, 287, 484; 385/15, 31, 36, 25, 26; 359/618, 639, 640, 831, 833, 834, 837, 196, 197, 200, 203, 204, 205, 211, 226

[56] References Cited

U.S. PATENT DOCUMENTS

| | | | |
|---|---|---|---|
| 4,322,126 | 3/1982 | Minowa et al. | 350/96.20 |
| 4,421,383 | 12/1983 | Carlsen | 350/96.18 X |
| 4,519,670 | 5/1985 | Spinner et al. | 350/96.15 |
| 4,634,239 | 1/1987 | Buhrer | 350/286 X |
| 4,872,737 | 10/1989 | Fukahori et al. | 350/96.20 |
| 4,973,123 | 11/1990 | Lützeler | 350/96.15 |

Primary Examiner—John D. Lee
Attorney, Agent, or Firm—Lawrence E. Monks

[57] ABSTRACT

A multiple port electromechanical optical fiber switch provides for the exchange redirection of one common optical path with one of several other optical paths through the switch. It is particularly useful when one standby laser transmitter must be quickly substituted for any single failed transmitter among a group of several actively operating transmitters. A single prism for exchanging the optical paths of two initially parallel beams by means of four refractions at their entry and exit points and at least two internal reflections per beam within the prism is set forth in modified rhombic form with two additional parallel facets that transmit undeflected in the deactivated position one of two beams so as to minimize required shift distance to the prism activated position where it exchanges the optical paths of both parallel beams.

8 Claims, 5 Drawing Sheets

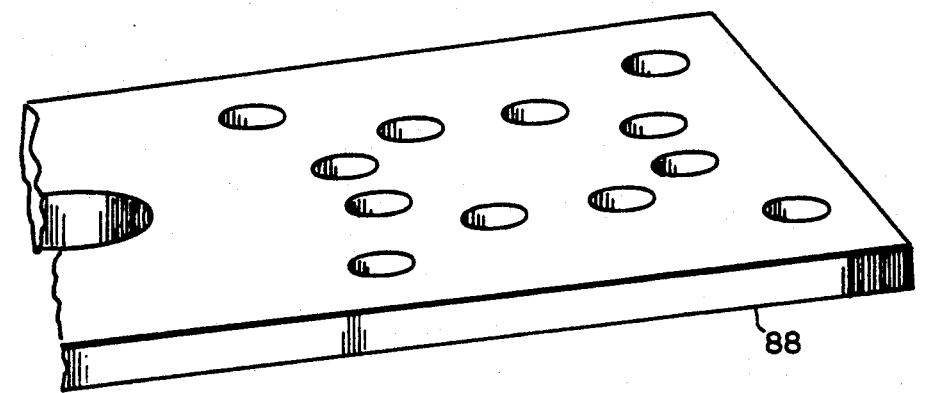
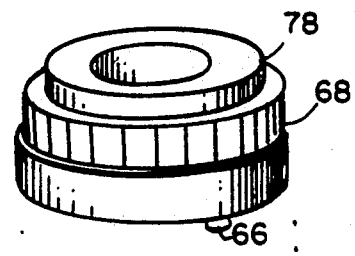
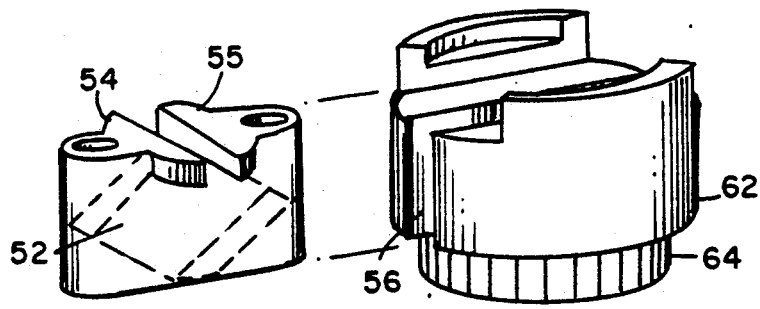
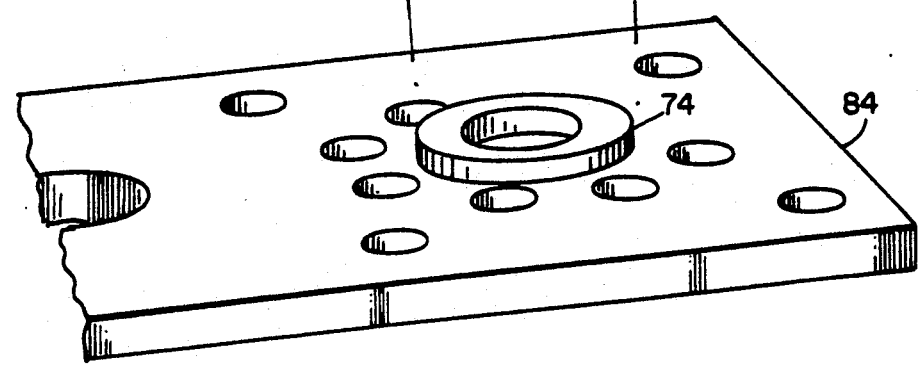
FIG. 3

MULTI-POSITION OPTICAL FIBER ROTARY SWITCH

FIELD OF THE INVENTION

This invention relates to a multiple port optical fiber switch for providing for the exchange redirection of one common optical path with one of a plurality of other optical paths. It further relates to a sliding prism for exchanging the optical paths of two initially parallel beams by means of four refractions at their entry and exit points and two internal reflections per beam within the prism. Accordingly, it is a general object of this invention to provide new and improved switches of such character.

BACKGROUND OF THE INVENTION

In fiber optic communication systems it is often desirable to reconnect one end of an optical fiber line to a replacement transmitter or receiver or to a line diagnostic device such as a time domain reflectometer. Optical fiber switches enable this reconnection to be accomplished from a remote point without the need for a craftsperson to perform this task by manually exchanging fiber optic connectors or splices. One principal class of optical fiber switches is the moving prism type in which the switching action results from the repositioning of a transparent reflecting and/or refracting prism in two or more parallel beams so as to cause the light travelling in the beams to change its course between sets of input/output fibers, coupled to the beams by lensed devices. U.S. Pat. No. 4,634,239 dated Jan. 6, 1987, having the same inventor and assignee as the present invention, is hereby incorporated by reference into the present application. In that disclosure, a multiple port optical fiber switch is described which uses a hexagonal prism design particularly well-suited for this type of fiber optic switch. The switch has a central beam coupled to input and output fibers by lenses and has eight similarly coupled parallel beams symmetrically spaced around the central beam. On each of the eight beams is one hexagonal prism through which it passes undeflected until the prism is repositioned by a radially inward motion, and this results in the exchange of light between the central beam and the one beam from which the prism was moved. Only one prism may be so activated at a time. Although the switch described in U.S. Pat. No. 4,634,239 presents a clear advantage over the prior art, it would be a still further improvement if the number of prisms could be reduced, resulting in a simpler operation and a lower cost switch.

OBJECTS OF THE INVENTION

It is an object of the present invention to obviate the above-noted and other disadvantages of the prior art.

It is a further object of the present invention to provide a novel optical switch using a single prism for the exchange redirection of one common optical signal with one of multiple optical signals.

It is a still further object of the present invention to provide a novel optical switch for multiple optical signals at a reduced cost.

It is a yet further object of the present invention to provide a motorized alignment system for the correct positioning of the single prism during the exchange redirection of the optical signals.

SUMMARY OF THE INVENTION

In accordance with one aspect of the present invention, a spacer block is mounted between two parallel rectangular plates each having a stepping motor and gear drive attached to its outer side with a cogged pulley on its output shaft protruding therethrough. Each plate includes eight holes equally spaced around a ninth hole adjacent to the center of the spacer block. The plates are positioned relative to each other such that a light ray entering one of the holes will pass unimpeded through a cavity in the spacer block and exit through the corresponding hole in the opposite plate. A slotted cylinder, having a first cogged pulley on one face thereof, is rotatively mounted in the cavity between the plates and positioned between the center holes. A slide housing an enclosed prism is mounted in the slot of the cylinder. A cam coupled to a second cogged pulley is connected to the slide such that rotation of the pulley causes a translation of the slide within the slotted cylinder. With the gear drives of the stepping motors coupled to the first and second cogged pulleys respectively, the slide rotates and translates radially outward, allowing the prism housed within to exchange light rays entering one of the holes on the circumference of the circle with light entering the center hole.

In another aspect of the invention, the slide housing the prism within is initially aligned by the stepping motors. Three optical sensing beams between light sources and detectors, connected to a control microprocessor, are used to determine the position of the slide and align it to its initial reference position.

BRIEF DESCRIPTION OF THE DRAWINGS

FIG. 3 is a perspective view of the slide and pulley assembly of one embodiment of the current invention.

DETAILED DESCRIPTION OF THE INVENTION

Figure 1:
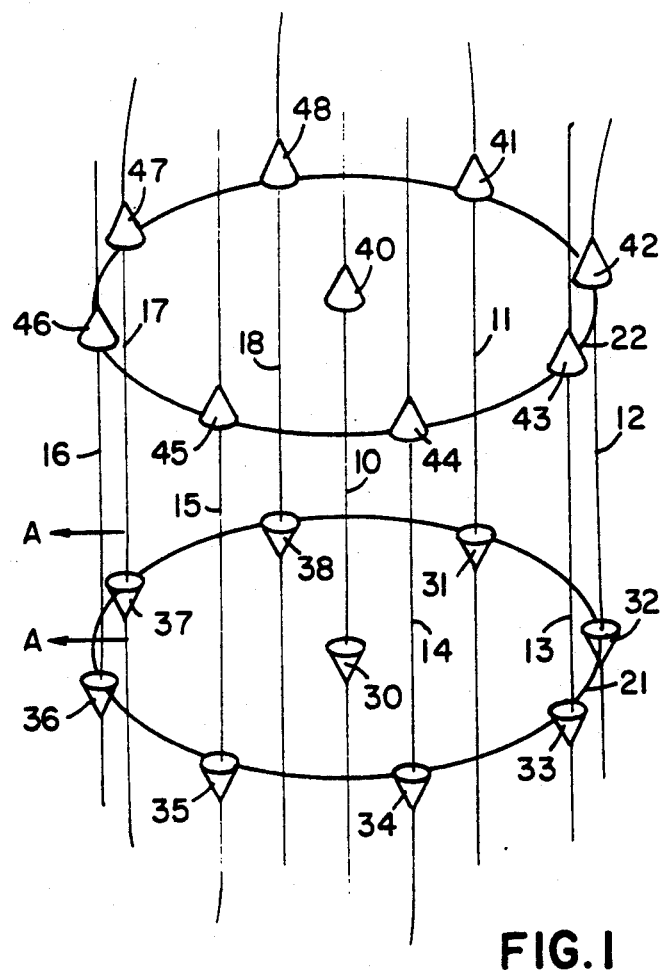
FIG. 1 is a diagram illustrating the optical geometry of one embodiment of this invention.

The optical geometry of one embodiment of the invention is depicted in FIG. 1. One central beam path 10 extends in a straight line between fiber lens connector bodies 30 and 40. Eight equally spaced paths 11 through 18 surround the path 10 and are parallel to it and to each other. Each of the paths 11 through 18 is terminated at both ends by fiber lens connectors 31 through 38 and 41 through 48. The set of input fiber lens connector bodies 30 through 38 are located at the center of and on the circumference of a circle 21 on one side of a switch housing while the set of output fiber connector bodies 40 through 48 are located at the center of and on the circumference of a circle 22 on the opposite side of the housing.

Figure 1A:
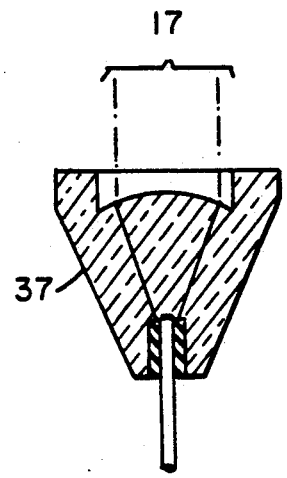
FIG. 1A is a cross-sectional view of an optical fiber lens connector body, taken along the line A—A of FIG. 1.

An optical fiber connector body 37 is, preferably, an expanded beam connector, such as depicted in U.S. Pat. No. 4,421,383, which is hereby incorporated by reference. There, an optical fiber connector body, molded into the connector body recessed inward from the reference surface, and a third surface forming a focal plane of the lens and having a point thereon one focal length from the lens surface. The third surface is parallel to the reference surface. With such a connector body, an optical fiber can be brought close to the aforesaid point. Light traveling through the fiber is expanded by the connector body and emerges from the lens convex surface as an expanded beam 17, as depicted in FIG. 1A.

Figure 2B:
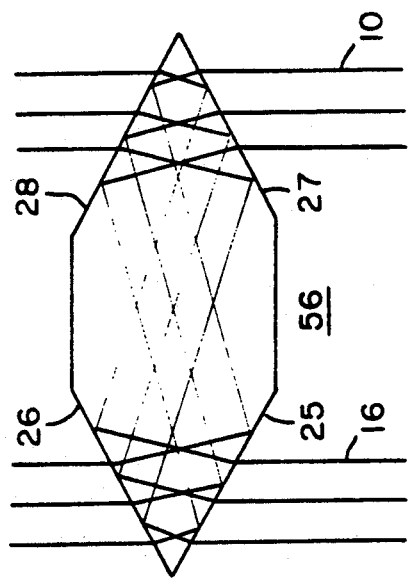
FIGS. 2A and 2B are illustrative views showing the effects the prism of one embodiment of this invention has on optical beams applied thereto.
Figure 2A:
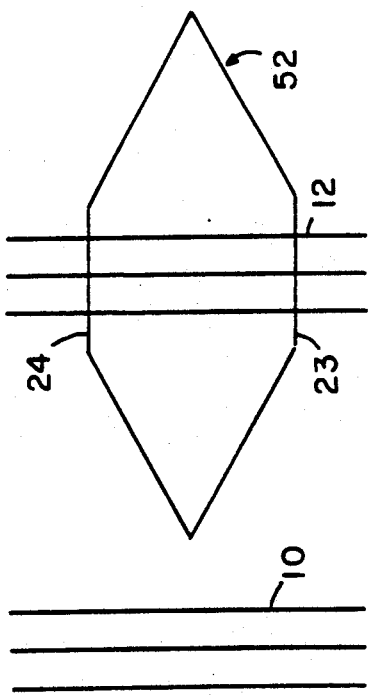

Referring to FIG. 2a, the hexagonal profile of the prism used in the present invention is the same as shown in U.S. Pat. No. 4,634,239 with the beam coupling input lens connectors 0 through 38 and output lens connectors 40 through 48 oriented the same as shown in FIG. 1. In the present invention prism 52 is nominally located on beam 10 transmitting light along a central axis from input fiber lens connector 30 to output fiber lens connector 40. Means are provided for rotating prism 52 about this central axis while beam 10 continues to pass through the prism and while beams 11 through 18 remain uninterrupted. Means are further provided to stop the rotation when prism 52 is angularly aligned with beam 16, for example, and then to translate it radially outward so as to intercept beam 16 as shown in FIG. 2b resulting in light from input connections 30 and 36 to exchange paths and appear as outputs 46 and 40 respectively.

The apparatus for producing this rotation and translation must fit within the space caged by beams 11 through 18 and should preferably not extend below the plane of the input connectors 30 through 38 nor above the plane of the output connectors 40 through 48 to avoid interference with their operation. One embodiment of the invention is apparatus 50 shown in FIG. 3. Prism 52 is mounted in slide 54 which can move radially in either direction in groove 56 of rotative mount 62 attached to cogged pulley 64. Affixed to slide 54 is cam slot 55 into which is engaged cam 66 of cogged pulley 68. Pulleys 64 and 68 rotate on ring bearings 74 and 78 respectively which are held in place by circular grooves on input and output connector mounting plates 84 and 88.

Figure 4:
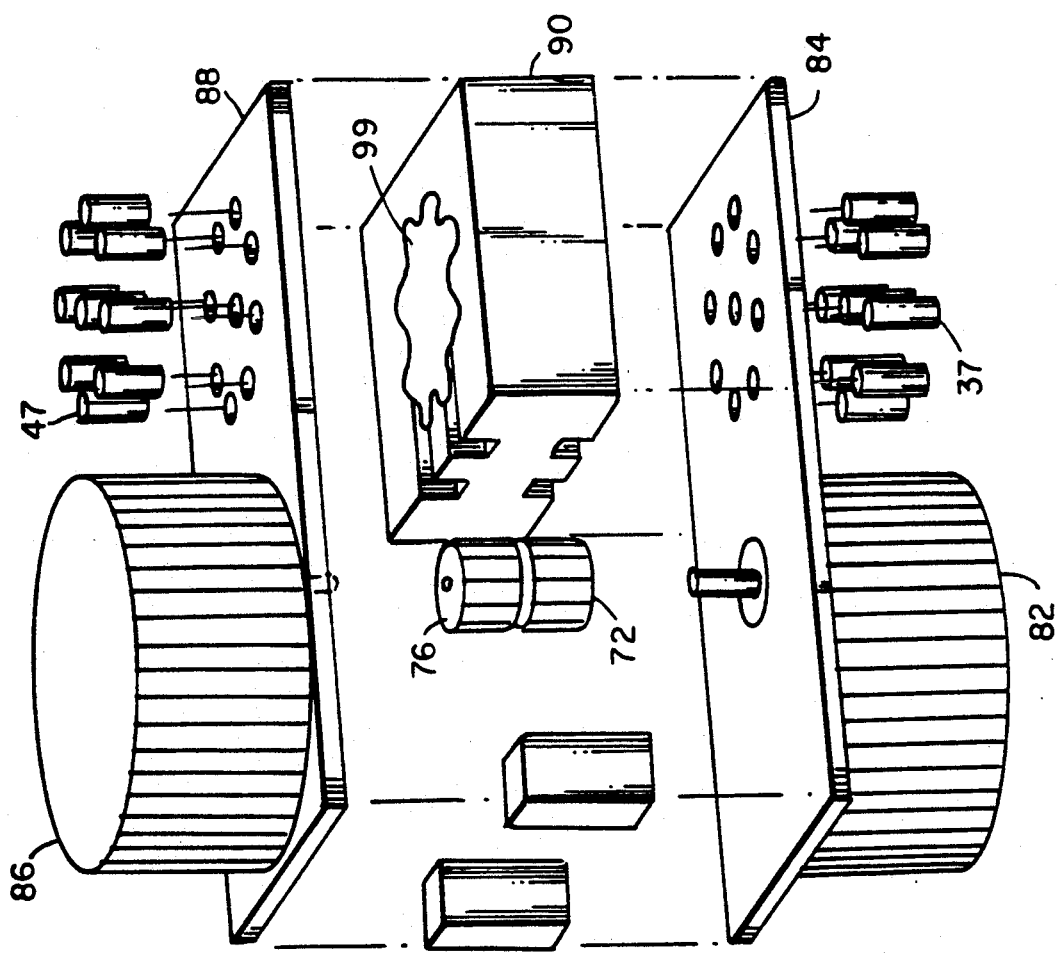
FIG. 4 is a perspective view of the stepping motor and spacer assembly for one embodiment of the invention.

Referring to FIG. 4 in conjunction with FIG. 3, Input mounting plate 84 is shown with input lens connectors 30 through 38 and output mounting plate 88 is shown with output lens connectors 40 through 48, both sets drawn for clarity separated from the plates onto which they are rigidly affixed (only lens connectors 37 and 47 are numbered). At the opposite ends of plates 84 and 88 are mounted stepping motors 82 and 86 which drive cogged pulleys 72 and 76 via internal gear trains. Cogged drive belts couple the rotational motion of cogged pulleys 72 and 76 to cogged pulleys 64 and 68. These cogged belts also known as timing belts are routed between adjacent beams and provide a non-slip connection resulting in the necessary rotary motion for mount 62 and cam 66 within the caged space.

Figure 5:
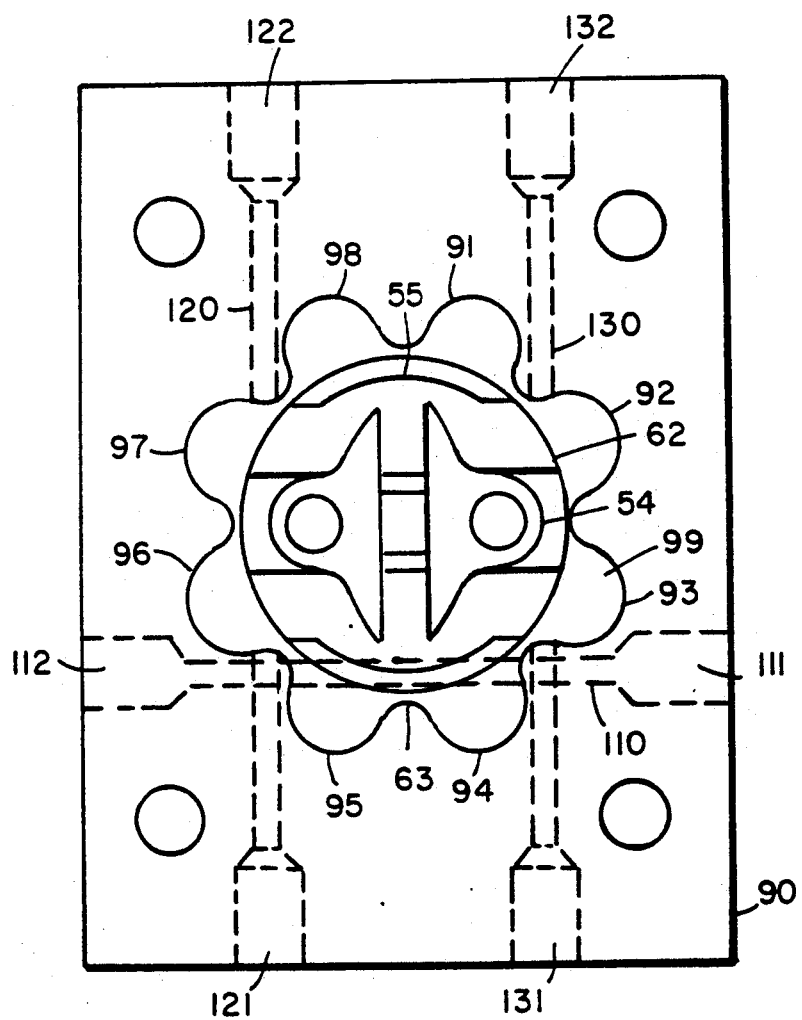
FIG. 5 is an exposed top view of the spacer, including the slide alignment apparatus of one embodiment of the current invention.

Connector mounting plates 84 and 88 are fastened to spacer 90 to hold the rotative assembly consisting of pulleys 64 and 68, rotative mount 62 and cam 66 in place so that its parts can rotate on ring bearings 74 and 78. Spacer 90 has an internal cavity 99 shaped to accommodate the nine beams passing therethrough and to precisely assist the rotational alignment of slide 54 as it moves into one of eight semicircular positions to allow prism 52 to intercept one circumferential beam. A plan view of spacer 90 with rotative mount 62 in its reference position is shown in FIG. 5. The centers of the cylindrically concave semicircular sides 91 through 98 of opening 99 are symmetrically disposed about the central beam axis at distances determined by the prism design as described in U.S. Pat. No. 4,634,239. As either cylindrical end of slide 54 enters one of the concave positions it is urged into exact angular alignment with the optical beam along the semicircular cylindrical axis of that position.

The multi-position optical fiber rotary switch is operated by first stepping both motors 82 and 86 in synchronism when slide 54 is centered within groove 56 of mount 62 such that slide 54 and prism 52 within it rotate while remaining centered on central beam 10. This is continued until slide 54 reaches the angular position corresponding to beam 16, for example, after which motor 82 is stopped and motor 86 is further stepped until cam 66 of cogged pulley 68 rotates 90 degrees relative to stationary mount 62 and its pulley 64. Cam 66 rides in slot 55 of slide 54 causing it to move radially outward during which time it temporarily blocks beams 10 and 16, but upon reaching the 90 degree position, prism 52 exchanges the transmission paths between input ports 30 and 36 and output ports 40 and 46. Any of the eight beams can be exchanged switched in this way with an initial rotation of mount 62 by 90 degrees or less followed by a relative rotation of cam 66 by plus or minus 90 degrees. This is because slide 54 can emerge from either end of slot 56 of rotative mount 62.

Initialization of the positioning within this multi-position optical fiber rotary switch is facilitated by optical sensing beams 110, 120, and 130, produced by light emitting diodes 111, 121, and 131, and received by photodetectors 112, 122, and 132 respectively. Beam 110 passes through hole 63 in rotative mount 62 only when mount 62 is initialized to its reference position midway between its angular positions required to move slide 54 into cylindrically concave sides 92 and 93. Slide 54 is initialized when it is in its mid position obstructing neither beam 120 nor beam 130 both orthogonal to beam 110. The operation of stepping motors 82 and 86 to reposition rotative mount 62 and slide 54 is controlled by a microcomputer. During an initialization procedure, mount 62 is brought to its reference position by rotating both motors together until the digitized output from photodetector 112 is maximized. Then slide 54 is initialized by rotating motor 86 causing cam 66 to move slide 54 until photodetector 122 and 132 both detect their light beams. The sense of slide 54 motion relative to motor 86 rotation is noted and utilized by the program during normal switch operation. At the reference position shown in FIG. 5, all nine beams conduct light straight from input lens connectors 30 through 38 to output lens connectors 40 through 48. When the microcomputer activates the switch rotative mount 62 rotates +/−22 ½ degrees or +/−67 ½ degrees and then cam 66 rotates +/−90 degrees. Any of the eight switch positions can be reached in this way.

The present invention is functionally equivalent to the multiple port optical fiber switch described in U.S. Pat. No. 4,634,239 but is much simpler in construction in that it requires only one beam exchanging prism. This results in considerable cost savings as these prisms must be made precisely if the switch is to have low insertion loss when used with single mode optical fibers.

While there has been shown and described what is at present considered the preferred embodiment of the invention, it will be obvious to those skilled in the art that various changes and modifications may be made therein without departing from the invention as defined by the appended claims.

What is claimed is:

1. Apparatus for providing for the exchange redirection of one common optical path with one of a plurality of other optical paths, wherein each of said plurality of other optical paths is parallel to, equidistant from and evenly spaced around said common optical path, said plurality of other optical paths intersecting input and output planes in a circular configuration, and said common optical path intersecting said input plane and said output plane at the center of said circular configuration, comprising:

a single prism between said input and said output planes, said prism oriented in a reference position on said common optical path so that light thereon can pass undeflected through said prism and so that light on each of said other optical paths can pass unimpeded adjacent said prism; and means for repositioning said prism by a rotation about said common optical path and a radial translation toward one of said plurality of other optical paths thereby intercepting and exchanging light thereon with light on said common optical path.

2. The apparatus of claim 1 for providing for the exchange redirection of one common optical path with one of a plurality of other optical paths wherein:

said prism has a first pair of parallel facets for transmitting light on said common optical path when said prism is located in said reference position, and a second and third pair of parallel facets for refracting light when said prism is repositioned to exchange light between said common optical path and one of said plurality of other optical paths.

3. The apparatus of claim 2 wherein:

said second and said third pair of parallel facets refract light entering and exiting said prism and twice reflect light travelling within said prism when said prism is repositioned to exchange light between said common optical path and one of said plurality of other optical paths.

4. The apparatus of claim 1 for providing for the exchange redirection of one common optical path with one of a plurality of other optical paths wherein:

means for repositioning said prism include a housing for said prism and a transversely slotted rotative mount having means for radially translating said housing.

5. The apparatus of claim 4 wherein:

said housing includes a groove and said rotative mount guides a cam operative in conjunction with said groove to translate said housing in said slotted rotative mount.

6. The apparatus of claim 5 wherein:

said rotative mount is driven by a first stepping motor coupled by a first belt, and said cam is driven by a second stepping motor coupled by a second belt, said first belt and said second belt passing between adjacent optical light paths.

7. The apparatus of claim 1 for providing for the exchange redirection of one common optical path with one of a plurality of other optical paths further comprising:

means for aligning said prism to said reference position, said means including a plurality of light sources and a plurality of light detectors to sense a predetermined position of said prism.

8. The apparatus of claim 1 for providing for the exchange redirection of one common optical path with one of a plurality of other optical paths wherein:

means for repositioning said prism include a microcontroller for moving said prism from said reference position to one of a plurality of positions where light on said common optical path is exchanged with light on one of said other optical paths.

* * * * *